United States Patent
Mukai et al.

(10) Patent No.: US 7,735,536 B2
(45) Date of Patent: Jun. 15, 2010

(54) FILAMENT WINDING APPARATUS

(75) Inventors: Toru Mukai, Nishikamo-gun (JP);
Natsuhiko Katahira, Toyota (JP);
Sakae Sugishima, Nishikamo-gun (JP);
Makoto Tsuzuki, Kariya (JP); Hidehito Kubo, Kariya (JP)

(73) Assignees: Toyota Jidosha Kabushiki Kaisha, Toyota-shi (JP); Kabushiki Kaisha Toyota Jidoshokki, Kariya-shi (JP)

( * ) Notice: Subject to any disclaimer, the term of this patent is extended or adjusted under 35 U.S.C. 154(b) by 673 days.

(21) Appl. No.: 11/578,344

(22) PCT Filed: Apr. 28, 2005

(86) PCT No.: PCT/JP2005/008573

§ 371 (c)(1),
(2), (4) Date: Oct. 12, 2006

(87) PCT Pub. No.: WO2005/105414

PCT Pub. Date: Nov. 10, 2005

(65) Prior Publication Data

US 2007/0221316 A1    Sep. 27, 2007

(30) Foreign Application Priority Data

Apr. 30, 2004    (JP)    ............................... 2004-136028

(51) Int. Cl.
*B65H 81/00*    (2006.01)
(52) U.S. Cl. ....................... 156/425; 156/428; 156/429; 156/430
(58) Field of Classification Search ................. 156/425, 156/428, 429, 430, 169, 173, 175
See application file for complete search history.

(56) References Cited

U.S. PATENT DOCUMENTS

| | | | | |
|---|---|---|---|---|
| 3,032,461 A | * | 5/1962 | Baker et al. .................. | 156/175 |
| 3,201,398 A | * | 8/1965 | Baker .......................... | 544/288 |
| 3,232,545 A | * | 2/1966 | Ross et al. .................. | 242/436 |
| 3,378,427 A | * | 4/1968 | Mcclean ...................... | 156/431 |

(Continued)

FOREIGN PATENT DOCUMENTS

DE    38 21 054 C2    10/1996

(Continued)

*Primary Examiner*—Jeff H Aftergut
(74) *Attorney, Agent, or Firm*—Kenyon & Kenyon LLP

(57) ABSTRACT

A filament winding apparatus for rotating in a predetermined direction a core material that is supported by a supporting portion, and for winding around the core material, an elongated material which has flexibility and which is impregnated with an unhardened synthetic resin material, the filament winding apparatus includes a plurality of feeding portions for feeding a plurality of elongated materials, and a plurality of guiding mechanisms which are positioned around the core material so as to correspond to the plurality of elongated materials that are drawn from the plurality of feeding portions, through which the corresponding elongated materials are passed, wherein at least one of the supporting portion and the plurality of guiding mechanisms are movable in a rotation axial direction, from a winding operation range in which the elongated materials can be guided by the guiding mechanisms to winding positions at which the elongated materials are wound around the core material, to an attachable/detachable position at which the plurality of guiding mechanisms is separated relatively from the core material and the supporting portion.

15 Claims, 11 Drawing Sheets

U.S. PATENT DOCUMENTS

| | | | |
|---|---|---|---|
| 4,010,906 A * | 3/1977 | Kaminsky et al. | 242/436 |
| 4,077,828 A * | 3/1978 | Strom | 156/429 |
| 4,172,562 A * | 10/1979 | Smith | 242/439.5 |
| 4,288,267 A * | 9/1981 | McLarty | 156/175 |
| 4,432,302 A * | 2/1984 | Farris et al. | 118/410 |
| 5,064,491 A | 11/1991 | Huvey | |
| 5,225,019 A | 7/1993 | Huvey | |
| 5,897,729 A * | 4/1999 | Bikson et al. | 156/172 |
| 6,146,481 A * | 11/2000 | Avni et al. | 156/169 |
| 2002/0139430 A1* | 10/2002 | Amano et al. | 138/153 |
| 2003/0051795 A1* | 3/2003 | Burgess | 156/169 |
| 2005/0039843 A1* | 2/2005 | Johnson et al. | 156/175 |

FOREIGN PATENT DOCUMENTS

| | | |
|---|---|---|
| EP | 0 036 447 | 9/1981 |
| JP | 01-500579 A | 3/1989 |
| JP | 03-118626 | 12/1991 |
| JP | 07-027831 | 5/1995 |
| JP | 08-072156 | 3/1996 |
| JP | 08-276502 A | 10/1996 |
| JP | 2002-283467 | 10/2002 |
| WO | WO-03/035380 A1 * | 5/2003 |

* cited by examiner

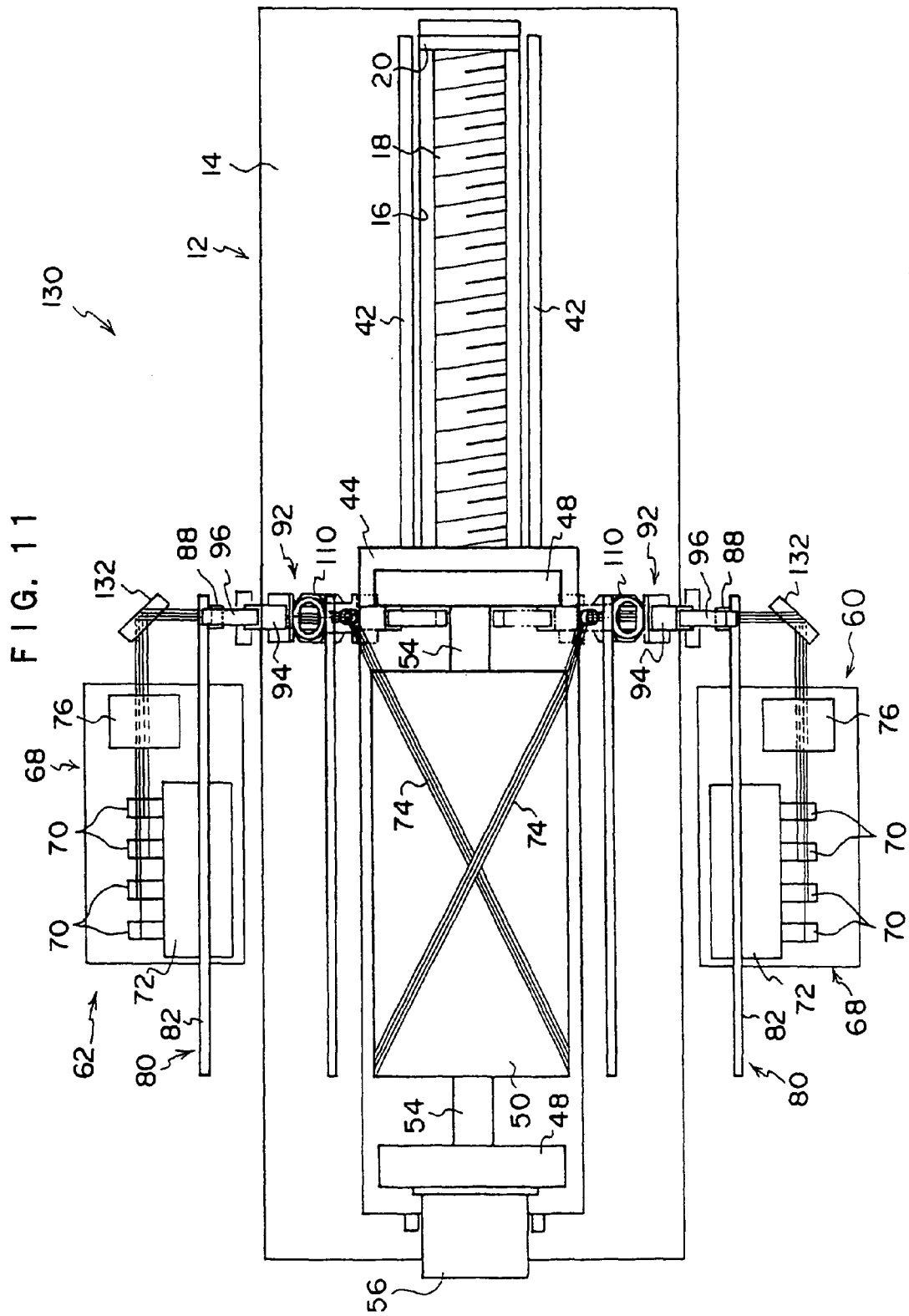

FILAMENT WINDING APPARATUS

This is a 371 national phase application of PCT/JP2005/008573 filed Apr. 28, 2005, claiming priority to Japanese Patent Application No. 2004-136028 filed Apr. 30, 2004, the contents of which are incorporated herein by reference.

FIELD OF THE INVENTION

The present invention relates to a filament winding apparatus for forming fiber reinforced plastic products by using a filament winding method.

BACKGROUND OF THE INVENTION

A so-called fiber reinforced plastic (hereinafter, referred to as an "FRP"), which is a composite material in which a fiber material such as a glass fiber is used as a reinforcing material and a synthetic resin material is used as a matrix resin, provides a high mechanical strength per weight. Accordingly, the FRP is employed for various types of structural materials in vehicles and architectural buildings.

One of the methods for forming the FRP is a filament winding method. The filament winding method is a method for forming the FRP by winding around a mandrel, filament which is impregnated with a resin, and a filament winding apparatus is used for realizing the filament winding method.

The filament winding apparatus has a creel for accommodating therein, long fibers, roving which is formed in a thread state by making a bunch of long fibers, and filament which is a generic name referring to an elongated tape or the like which is formed by long fibers, in a take-up state, for example. Filament at tip end side which is drawn from the creel is wound around a core material that is referred to a "mandrel".

A pre-heater and a resin impregnating reservoir are disposed between the creel and the mandrel. Filament which is drawn from the creel is passed through the pre-heater and the resin impregnating reservoir, while being forwarded to the mandrel.

Filament is subjected to dehumidification by passing through the pre-heater. Further, the dehumidified filament is passed through the resin impregnating reservoir, and is applied and impregnated with a thermosetting synthetic resin material. Thus, the filament which is impregnated with the synthetic resin material is passed through a ring-shaped thread-feeding opening and then entrained around the mandrel.

In this state, due to a rotation of the mandrel around a fixed shaft center, filament is sequentially wound, from tip ends thereof, around the mandrel with a predetermined pattern and a tensional force is caused by the filament being wound around the mandrel due to a rotation of the mandrel. Due to this tensional force, subsequent filament is drawn from the creel and wound around the mandrel. Further, the mandrel for which winding of filament has been completed is introduced into a hardening furnace, and the synthetic resin material is hardened.

By the way, ordinarily, the filament winding apparatus has a traverser mechanism. The traverser mechanism has guide rails which extend along the direction of an axial direction of a rotation of the mandrel. The thread-feeding opening is attached to the guide rails so as to be slidable in a lengthwise direction of the guide rails. Further, the guide rails have a ball screw or the like, and due to a driving force of driving means (mechanism) such as a motor, the ball screw allows the thread-feeding opening to slide in the lengthwise direction of the guide rails, in other word, an axial direction of a rotation of the mandrel.

In a state in which, due to a rotation of the mandrel, filament is wound around the mandrel, the thread-feeding opening is guided by the guide rails at predetermined timing and speed, and moved in a direction of the axial direction of a rotation of the mandrel. By this, a position at which filament is wound around the mandrel is changed in the axial direction of a rotation of the mandrel. For example, filament is wound around a predetermined region (including an entire region) of the mandrel in the axial direction of a rotation of the mandrel.

On the other hand, Japanese Patent Application Laid-Open (JP-A) No. 8-72156 discloses a filament winding apparatus having a structure in which, due to a driving force of a DC servo motor, a mandrel (it is referred to as a take-up type mandrel in JP-A No. 8-72156) is rotated, and moved back and forth in an axial direction of a rotation of the mandrel. In this way, the filament winding apparatus disclosed in JP-A No. 8-72156 is structured such that, during a rotation of the mandrel, the mandrel is moved back and forth in the axial direction of a rotation of the mandrel, and a position at which filament is taken up is changed in the axial direction of a rotation of the mandrel. Accordingly, filament (which is referred to as fiber in JP-A No. 8-72156) can be taken up around the mandrel without swinging the filament in a left-hand direction and a right-hand direction (i.e., the axial direction of a rotation of the mandrel).

On the other hand, examples of means for improving production efficiency in such a filament winding apparatus as described above include an increase of a rotational speed of the mandrel, in other words, an increase of a winding speed of filament. Due to an increase of the winding speed of filament, time from the beginning of winding to the end thereof can be reduced thus making it possible to enhance production efficiency.

However, in an ordinary filament winding apparatus in which a thread-feeding opening is moved in an axial direction of a rotation of a mandrel, a speed at which a thread-feeding opening is moved back and forth must be increased by increasing a speed at which filament is wound around the mandrel. For this reason, acceleration/deceleration of the thread-feeding opening is increased, whereby filament is swung largely between a creel which is a feeding portion of the filament, and the thread-feeding opening.

In this way, by filament being swung largely, distortion or twisting of the filament may occur resulting into scuffing thereon, or deterioration of a forming quality due to unexpected change of tension at the filament may occur.

Further, as another means for improving production efficiency, it can be considered to provide a plurality of arrangements from a creel to a thread-feeding opening (hereinafter, which is referred to as a "filament feeding arrangement"), and wind a plurality of filaments around a mandrel at one time. In this way, since the filament winding apparatus is structured such that a plurality of filaments is wound around the mandrel at one time, by considering simply, with only one rotation of the mandrel, a plurality of filaments can be wound around the mandrel at the same time.

For this reason, as compared to a case in which one filament is wound around the mandrel with one rotation of the mandrel, the number of rotations of the mandrel is determined by being divided by the number of filaments (wherein the number of filaments is n, 1/n times). Accordingly, time from the start of winding to the end thereof can be reduced thereby allowing production efficiency to be improved.

However, in such a structure as described above, a plurality of sets of filament feeding arrangements is required. Therefore, various problems are caused in a layout of such filament feeding arrangements.

In other words, an aspect of a layout of the filament feeding arrangements can be considered first in which the filament feeding arrangements are respectively disposed around the mandrel. However, if the filament feeding arrangements are structured as described above, when the mandrel is attached/detached with respect to supporting portions for supporting the mandrel, the supporting portions are interfered with the filament feeding arrangements thus making is extremely difficult to attach/detach the mandrel with respect to the supporting portions.

Further, another aspect of a layout of the filament feeding arrangements can also be considered first in which the filament feeding arrangements are arranged along a rotation radius direction or an axial direction of a rotation of the mandrel. However, in a case of such a structure, the apparatus as a whole becomes larger. Moreover, in the structure in which the filament feeding arrangements are arranged along a axial direction of a rotation of the mandrel, lengths of the filaments from the creel to the thread-feeding opening or those of the filaments from the thread-feeding opening to the take-up position at the mandrel are different from each other for each filament feeding arrangement thus causing possibility to vary tensional force or the like for each filament.

As yet another means for improving production efficiency, a structure can be considered in which a plurality of sets of supporting portions for supporting the mandrel is provided, and the filament feeding arrangements corresponding to the respective supporting portions can be provided.

In the case of this structure, during a winding of filament from the start to the end, filament can be wound around a plurality of sets of mandrels. Accordingly, a winding time which is determined by dividing the winding time of the filament around a plurality of sets of mandrels with the number of the mandrels can be reduced, whereby productivity can be improved.

Further, only one set of filament feeding arrangement is provided for one set of a mandrel. For this reason, deterioration of attachability/detachability of the mandrel by the mandrel being interfered with the filament feeding arrangement which is one of the problems when a plurality of sets of filament feeding arrangements is provided for one set of the mandrel, is difficult to occur.

Moreover, productivity can be improved without increasing the rotational speed of the mandrel. For this reason, a problem with an increase of the rotational speed of the mandrel is difficult to occur.

However, since a plurality of sets of supporting portions for supporting the mandrel or the plurality of sets of the filament feeding arrangements are provided and they are aligned each other, the apparatus becomes larger. Besides, since the supporting portions for supporting the mandrel or a plurality of sets of filament feeding arrangements are aligned each other, an apparatus which is able to use a large mandrel becomes much larger, which is not practical.

SUMMARY OF THE INVENTION

In view of the aforementioned facts, an object of the present invention is to provide a filament winding apparatus in which time for winding an elongated material can be reduced without damaging operability during attachment/detachment of a core material, and which can prevent the apparatus from becoming larger.

In order solve the aforementioned problems, the present invention is a filament winding apparatus for rotating in a predetermined direction a core material that is supported by a supporting portion, and for winding around the core material, an elongated material which has flexibility and which is impregnated with an unhardened synthetic resin material, the filament winding apparatus includes a plurality of feeding portions for feeding a plurality of elongated materials, and a plurality of guiding mechanisms which are positioned around the core material so as to correspond to the plurality of elongated materials that are drawn from the plurality of feeding portions, and through which the corresponding elongated materials are passed, wherein at least one of the supporting portion and the plurality of guiding mechanisms are movable in a rotation axial direction, from a winding operation range in which the elongated materials can be guided by the plurality of guiding mechanisms to winding positions at which the elongated materials are wound around the core material, to an attachable/detachable position at which the plurality of guiding mechanisms is separated relatively from the core material and the supporting portion in the rotation axial direction.

In accordance with the filament winding apparatus having the above-described structure, a plurality of elongated materials that are drawn from one or more accommodating portions such as creel stands for accommodating therein the elongated materials so as to be drawn from tip ends thereof are applied and impregnated with an unhardened (in other words, liquefied or gelled) synthetic resin material. Further, the plurality of elongated materials is guided to winding positions by the guiding mechanisms (means) which are provided around the core material so as to correspond to the respective elongated materials, and wound around the core material. In this state, when the core material is rotated around a predetermined shaft due to a driving force of a motor or the like, each elongated material is wound around the core material.

Due to a rotation of the core material, each of the elongated material is wound around the core material from a tip end thereof, whereby a tensional force is applied to the elongated material and pulled to the tip end side thereof. The subsequent portion (i.e., a proximal end portion side of the elongated material) of the elongated material thus pulled is sequentially drawn from the aforementioned accommodating portion, and applied with the synthetic resin material, and wound around the core material.

Further, in the filament winding apparatus according to the present invention, at least one of the supporting portion and the plurality of guiding mechanisms are appropriately displaced within a winding operation range along the axial direction of a rotation of the core material (hereinafter, this direction is simply referred to as "rotation axial direction"). Due to the change of the position, a winding position of each elongated material with respect to the core material is changed. Consequently, each elongated material is wound around the core material with a desired configuration, and formed.

On the other hand, as described above, during a winding operation of each elongated material with respect to the core material, at least one of the supporting portion and the plurality of guiding mechanisms is displaced within the winding operation range. However, when a winding of each elongated material around the core material is completed, at least one of the supporting portion and a plurality of guiding mechanisms is displaced from the winding operation range to a position at which the core material is attachable/detachable, and the plurality of guiding mechanisms is relatively separated from the core material and the supporting portion.

In this state, the core material is detached from the supporting portion, and the core material around which the elongated material has been wound receives a hardening treatment of a synthetic resin material. As a result, a fiber reinforced resin mold (if the elongated material is glass fiber, glass fiber reinforced plastic) is formed.

At this point, in the filament winding apparatus according to the present invention, a plurality of elongated materials is guided by a plurality of guiding mechanisms which are positioned around the core material so as to correspond to each of the plurality of elongated materials, and each elongated material is wound around the core material. For this reason, as compared to a structure in which only one elongated material is wound around the core material to form a mold, a considerable amount of operation time for winding can be reduced, and extremely high productively can be obtained.

The filament winding apparatus according to the present invention is structured such that a plurality of guiding mechanisms is disposed around the core material. However, when a winding operation for each elongated member is completed, the plurality of guiding mechanisms is relatively separated in the rotation axial direction from the core material and the supporting portion. Accordingly, when the core material having the elongated materials wound therearound is detached from the supporting portion, the detachment operation is not interfered with devices or members which are provided in association with a plurality of guiding mechanisms or guiding mechanisms. Consequently, operability of attachment/detachment operations of the core material with respect to the supporting portion can be improved to a great deal.

Further, in other words, when the core material is detached from the supporting portions, since the supporting portions and the core material are moved to a position at which they are not interfered with the guiding mechanisms, the plurality of guiding mechanisms can be positioned in the vicinity of the position of the supporting portion and winding positions of the core material when each elongated material is wound around the core material. As a result, the apparatus as a whole can be made compact, and the space for providing the apparatus can be saved.

In the present invention, as described above, either one of the supporting portion and the plurality of guiding mechanisms can suffice the structure of being movable in the rotation axial direction. In other words, it can be the supporting portion or the plurality of guiding mechanisms to move in the rotation axial direction due to a driving force or the like. Alternatively, both the supporting portion and the plurality of guiding mechanisms are movable in the rotation axial direction.

In the present invention, the elongated material can be formed by a fiber-like member (fiber member) or a string-like member which is formed by twisting fiber members. Further, the elongated material can be formed by an elongated tape-like (strip-like) member or a sheet-like member.

Further, in the filament winding apparatus according to the present invention, the plurality of guiding mechanisms can be movable individually in the rotation axial direction.

Further, in the filament winding apparatus having the aforementioned structure, since the plurality of guiding mechanisms is movable individually in the rotation axial direction, before the winding operation or during the winding operation, winding positions at which the elongated materials are wound around the core material along the rotation axial direction can be varied or made identical for each elongated material. Accordingly, although the filament winding apparatus according to the present invention is structured such that a plurality of elongated materials is wound around the core material substantially coaxially and formed, the present invention can be applied to various types of winding patterns of the elongated material around the core material.

Further, in the filament winding apparatus according to the present invention, when the elongated material is wound around the core material, the supporting portion can be movable in the rotation axial direction within the winding operation range.

In accordance with the filament winding apparatus having the above described structure, when the core material is rotated to wind the elongated material therearound, the supporting portion is moved in the rotation axial direction within the winding operation range. Accordingly, in this state, if the plurality of guiding mechanisms is not moved in the rotation axial direction, the moving trace of the elongated material between the feeding portion of the elongated material and the core material is not fundamentally changed.

Therefore, when the elongated material is wound around the core material, disadvantages such as twisting or distortion, and scuffing and unexpected change of tensional force of the elongated material between the feeding portion and the core material do not occur (or hard to occur). Accordingly, an effective improvement in forming quality can be provided.

In addition, the higher the speed at which the elongated materials are fed to the core material is (in other words, the rotational speed of the core material), the easier the disadvantages occur. However, in the filament winding apparatus according to the present invention, such disadvantages as described above do not occur (or hard to occur) to begin with. For this reason, if the feeding speed is increased, forming quality can be maintained. In this way, even when the feeding speed can be increased, manufacturing speed (production efficiency) can be enhanced.

Further, in the filament winding apparatus according to the present invention, the plurality of guiding mechanisms can be moved in a direction opposite to that of the supporting portion in accordance with the rotation axial direction movement of the supporting portion.

In accordance with the filament winding apparatus having the above-described structure, when the core material is rotated, and the elongated member is wound therearound, when the supporting portion is moved to the rotation axial direction one side within the winding operation range, in accordance with the movement of the supporting portion, each guiding mechanism is moved to the rotation axial direction other side which is opposite to the moving direction of the supporting portion.

Therefore, in order to obtain a moving stroke when merely the supporting portion is moved by using the filament winding apparatus according to the present invention, the moving stroke of the supporting portion can be shortened by the same amount which is equal to the moving stroke of the plurality of guiding mechanisms. If the moving speed of the supporting portion is the same, the moving time can be reduced. Accordingly, time for a winding operation can be reduced, and operation efficiency can be improved to a great deal.

On the other hand, if the moving stroke in a case in which only the plurality of guiding mechanisms is moved is obtained by the filament winding apparatus according to the present invention, the moving stroke of the plurality of guiding mechanisms can be shortened by the moving stroke of the supporting portion. Accordingly, change in the moving trace of the elongated material between the feeding portion of the elongated material and the core material can be minimized.

For this reason, when the elongated material is wound around the core material, occurrences of disadvantages such as twisting, distortion, scuffing, and unexpected change of tensional force of the elongated material between the feeding portion and the core material can be reduced, whereby an effective improvement in forming quality can be provided.

In addition, the higher the speed at which the elongated materials are fed to the core material is (in other words, the rotational speed of the core material), the easier the disadvantages occur. However, in the filament winding apparatus according to the present invention, such disadvantages can be mitigated. For this reason, even if the feeding speed is increased, forming quality can be maintained. In this way, even when the feeding speed can be increased, manufacturing speed (production efficiency) can be enhanced.

Moreover, in the filament winding apparatus according to the present invention, the plurality of guiding mechanisms can be provided on a substantially concentric circumference with the rotation axis as a center.

In accordance with the filament winding apparatus having the aforementioned structure, since the plurality of guiding mechanisms is provided on a substantially concentric circumference with the rotation axis of the core material as a center, a distance from the core material to each guiding mechanism is comparatively equal. Consequently, when the core material is rotated, variation of the tensional force applied to each elongated material can be minimized, whereby formability or the like can be improved.

Further, in order to solve the aforementioned facts, the present invention provides a method of manufacturing a composite material by using a filament winding method for rotating in a predetermined direction a core material which is supported by a supporting portion, and for winding around the core material, an elongated material which has flexibility and which is impregnated with an unhardened synthetic resin material, the method includes feeding a plurality of elongated materials from a plurality of feeding portions, passing the plurality of elongated materials that are drawn from the plurality of feeding portions through a plurality of corresponding guiding mechanisms, positioning the plurality of guiding mechanisms around the core material, and moving at least one of the supporting portion and the plurality of guiding mechanisms in a rotation axial direction, from a winding operation range in which the elongated materials can be guided by the guiding mechanisms to winding positions at which the elongated materials are wound around the core material, to an attachable/detachable position at which the plurality of guiding mechanisms is separated relatively from the core material and the supporting portion in the rotation axial direction.

BRIEF DESCRIPTION OF THE DRAWINGS

FIG. 11 is a plan view illustrating the filament winding apparatus in FIG. 10.

DETAILED DESCRIPTION

First Embodiment

Figure 1:
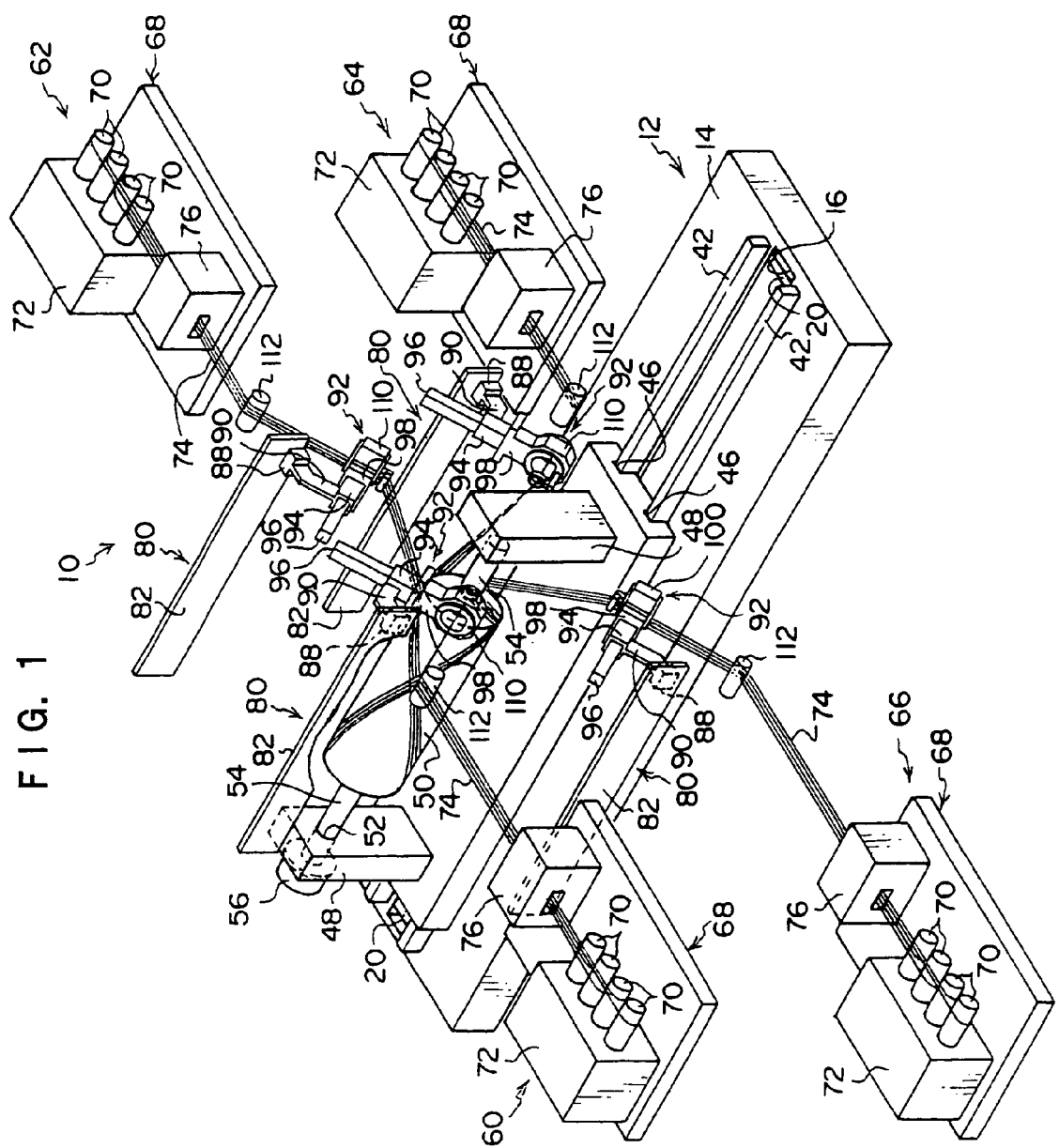
FIG. 1 is a perspective view of a filament winding apparatus according to a first embodiment of the present invention.
Figure 2:
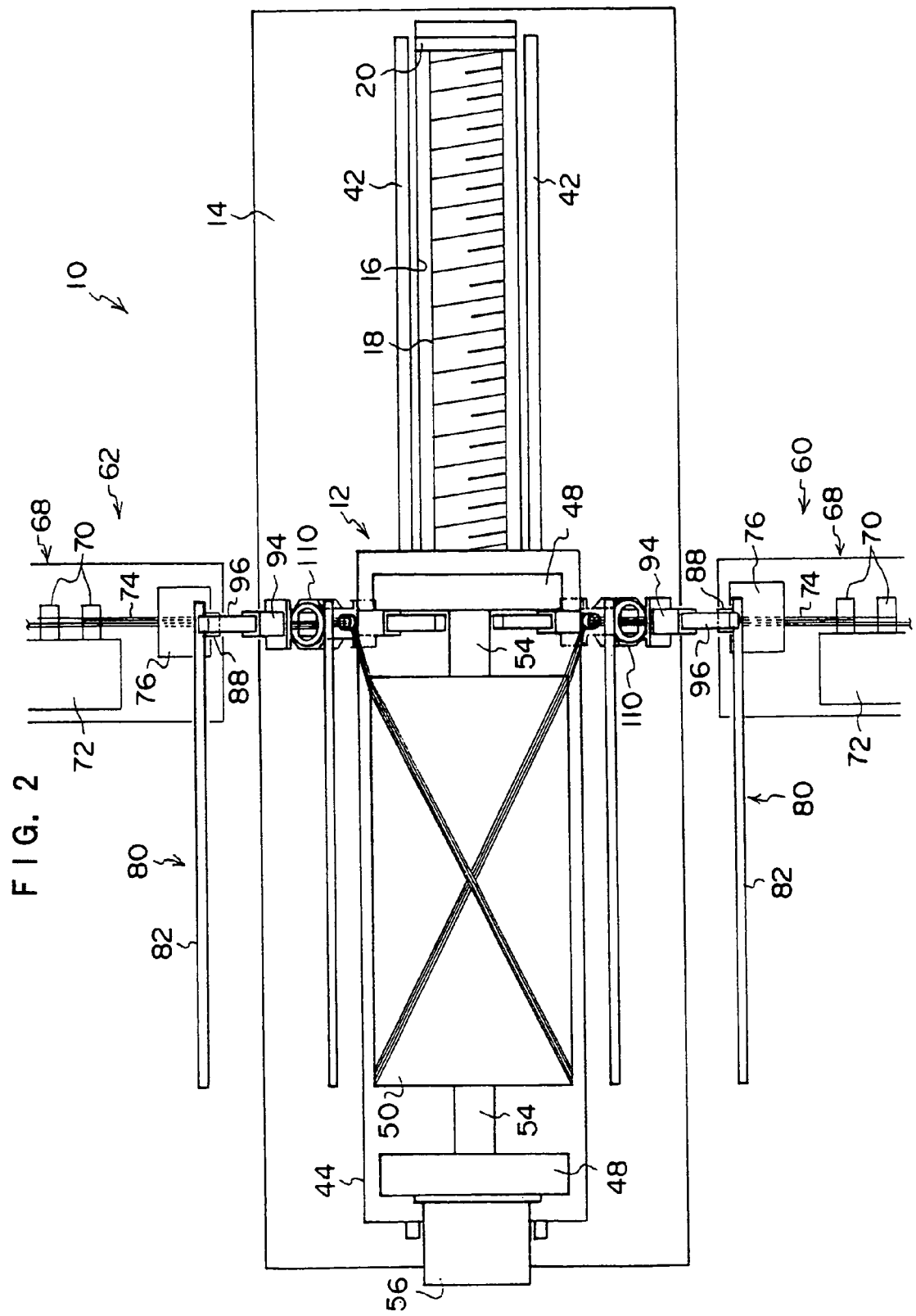
FIG. 2 is a plan view of the filament winding apparatus in FIG. 1.
Figure 3:
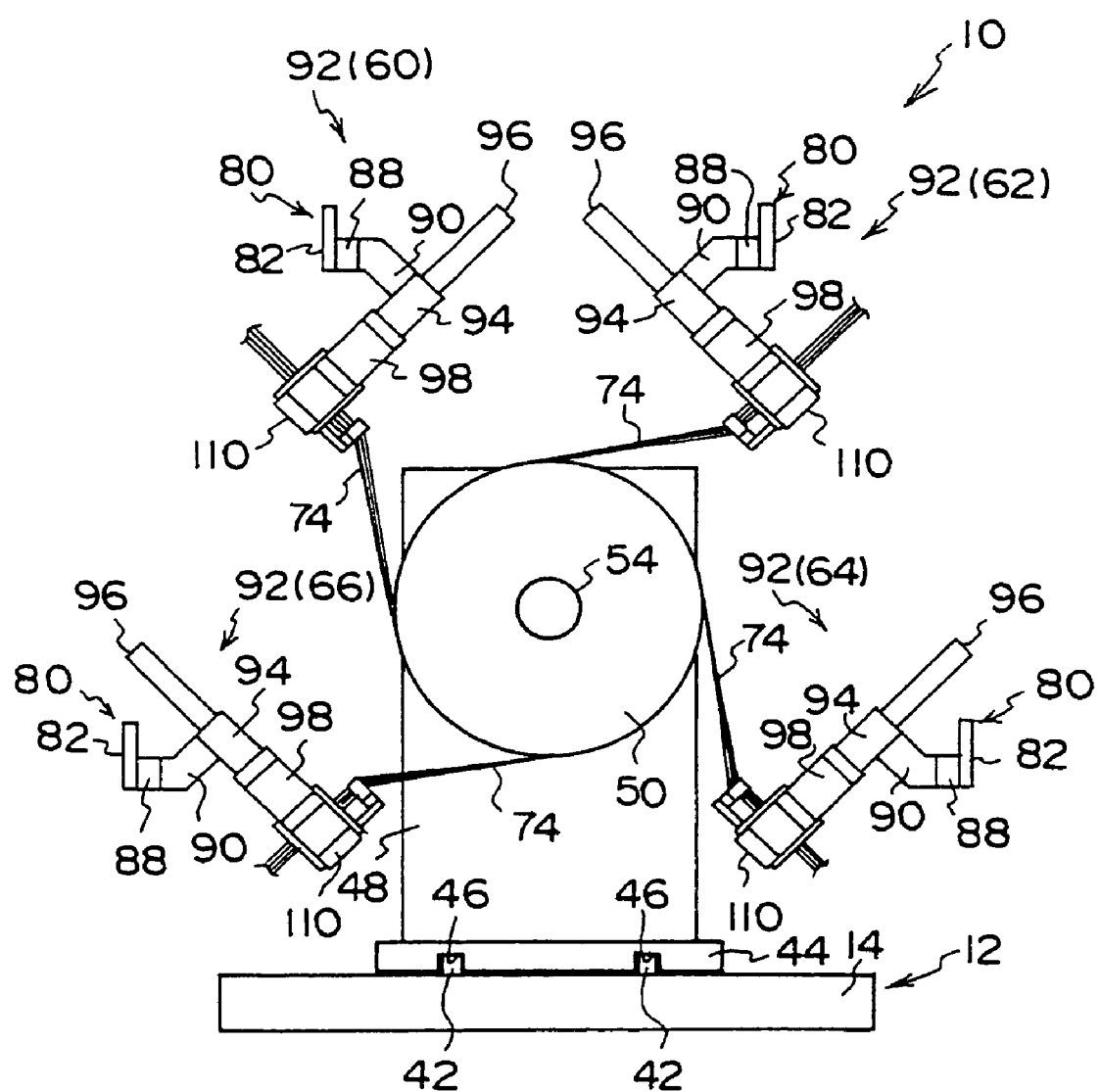
FIG. 3 is a front view of the filament winding apparatus in FIG. 1.

FIG. 1 shows a perspective view of a filament winding apparatus 10 according to a first embodiment of the present invention. Further, FIG. 2 shows a schematic plan view of the filament winding apparatus 10 of the present embodiment. Moreover, FIG. 3 shows a schematic front view of the filament winding apparatus 10 of the present embodiment.

(Structure of a Mandrel Driving Mechanism 12)

As shown in FIG. 1, the filament winding apparatus 10 has a mandrel driving mechanism 12 as a core material sliding mechanism and a core material rotating mechanism. The mandrel driving mechanism 12 has a traverse base 14 for structuring the core material sliding mechanism.

The traverse base 14 is entirely formed into a rectangular plate shape. A substantially rectangular opening portion 16 is formed at a widthwise direction intermediate portion on a top of the traverse base 14. The opening portion 16 is formed into a substantially slit shape which is long along a lengthwise direction of the traverse base 14, and communicates with an inner portion and an outer portion of the traverse base 14.

Figure 4:
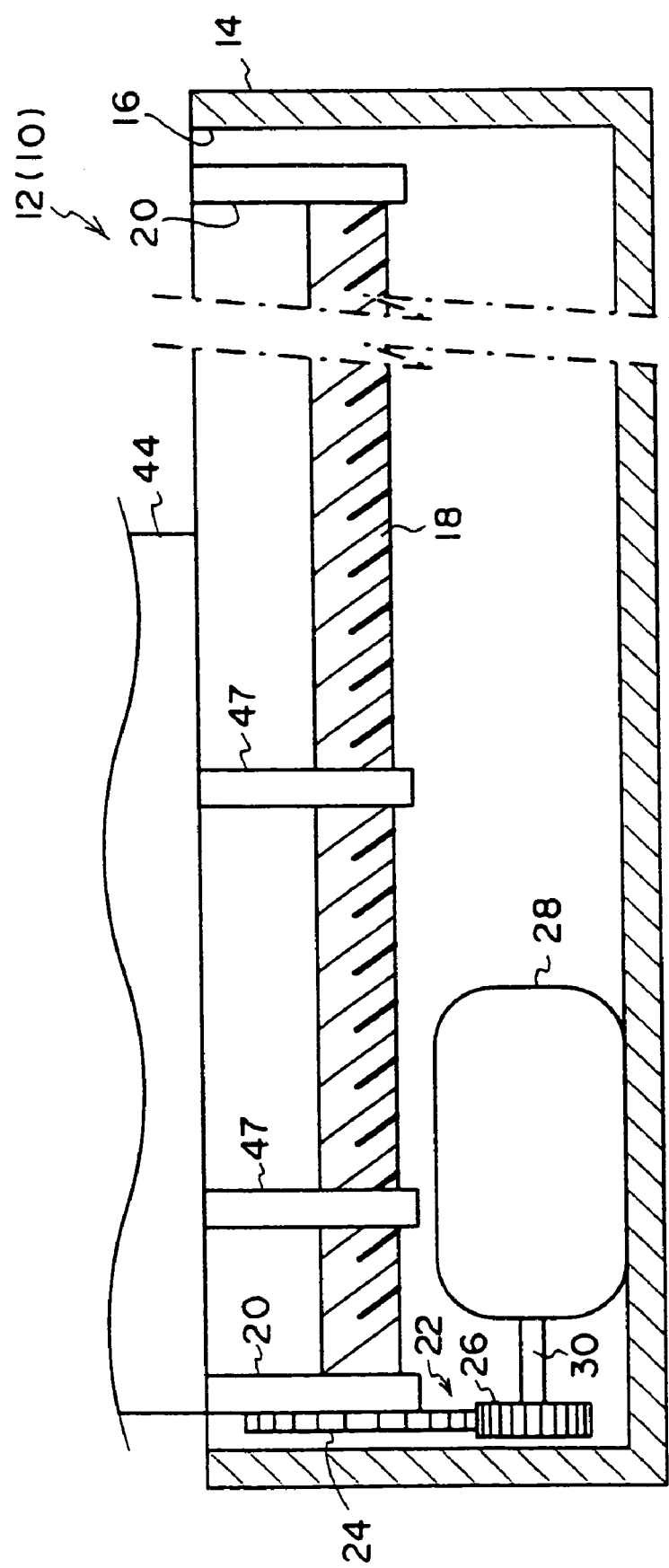
FIG. 4 is a cross-sectional diagram illustrating a schematic structure at the inside of a traverse base of the filament winding apparatus in FIG. 1.

As shown in FIG. 4, a ball screw 18 for structuring core material sliding/driving means (mechanism) of the core material sliding mechanism is disposed at an inside of the traverse base 14. The ball screw 18 is long along the lengthwise direction of the traverse base 14, and is provided at the traverse base 14 in such a way that both ends in a lengthwise direction of the ball screw 18 are pivotally supported at supporting bodies 20 so as to be freely rotatable around a shaft center of the ball screw 18. A decelerating mechanism 22 is provided at a lengthwise direction (axial direction) one end side of the ball screw 18 to structure the core material sliding/driving means, together with the ball screw 18.

The deceleration mechanism 22 has a gear 24, which is coaxially and integrally connected to the ball screw 18. The gear 24 meshes with a gear 26. Further, an output shaft 30 of a motor 28 as a driving source is mechanically connected to the gear 26 to structure the core material sliding/driving means, together with the ball screw 18 and the deceleration mechanism 22. Due to a driving force when the motor 28 is normally driven and rotated, when the output shaft 30 is rotated, the rotational force is transmitted to the ball screw 18, the ball screw 18 itself is normally rotated around its shaft center. If the motor 28 is driven to rotate reversely, the ball screw 18 is rotated reversely as opposed to a normal rotation.

Figure 5:
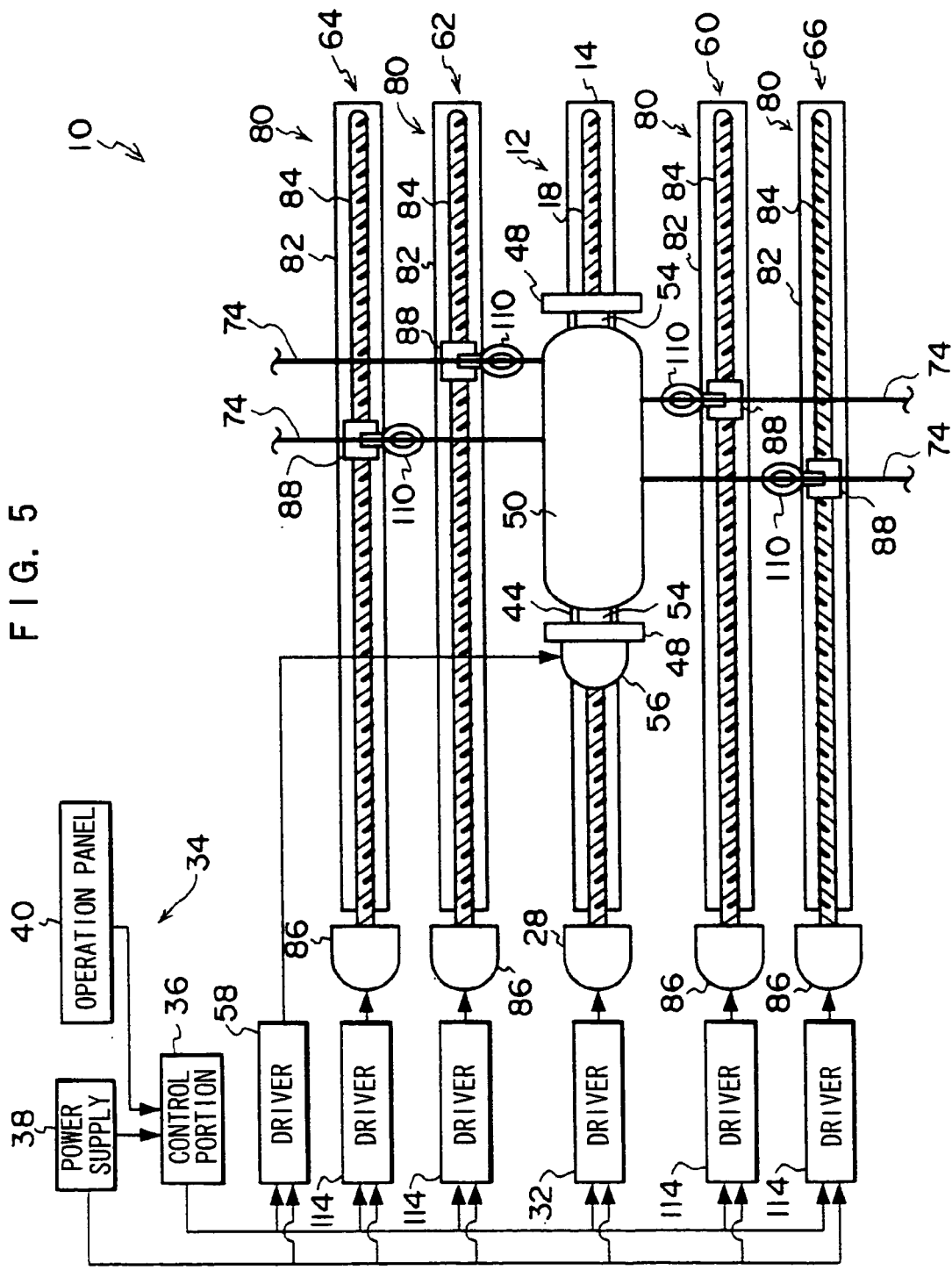
FIG. 5 is a schematic control diagram of a driving system of the filament winding apparatus in FIG. 1.

On the other hand, as shown in a block diagram of FIG. 5, the motor 28 is connected, through a driver 32, to a control portion 36 and a power supply 38 in a controller 34 as control means (mechanism). The control portion 36 is connected to an operation panel 40 to control both the driver 32 on the basis of an operation signal transmitted from the operation panel 40 and a current flown from the power supply 38 into the motor 28.

Further, a structure of the above-described core material sliding/driving means will be additionally explained next.

The present embodiment is structured in such a way that the driving force of the motor 28 is decelerated by the decelerating mechanism 22 and transmitted to the ball screw 18. However, the motor 28 may be directly connected to the ball screw 18 without the decelerating mechanism 22. Further, in the present embodiment, in order to make the explanation more simply, the deceleration mechanism 22 is structured by the gears 24 and 26. However, it is needless to say that the deceleration mechanism 22 may be structured by a gear row in which lots of gears are meshed with one another, and it can be structured by not only a spur gear but also various types of gears such as a worm gear and a worm wheel or a bevel gear.

Further, the deceleration mechanism 22 is recognized as driving force transmitting means (mechanism) for transforming a driving force of the motor 28 to the ball screw 18. However, the driving force transmitting means is not limited to a gear row comprising the gears 24 and 26, and however, instead, it can also be structured such that the driving force of the motor 28 is transmitted to the ball screw 18 through belt transmission, chain transmission or the like. Moreover, hereinafter, the above-described additional explanation is referred to as "additional explanation 1".

Moreover, as shown in FIG. 1, a pair of guide rails 42 as core material sliding/guiding means (mechanism) for structuring the core material sliding mechanism is provided on the top of the traverse base 14. The guide rails 42 are long in the lengthwise direction of the traverse base 14 and run in parallel so as to face each other in a widthwise direction of the traverse base 14.

Further, a slide base 44 for structuring the core material sliding mechanism is provided on the traverse base 14. The slide base 44 is formed into a substantially plate shape or a substantially block shape.

A pair of guide grooves 46 for structuring the core material sliding/guiding means in combination with the guide rails 42 is formed at the bottom surface of the slide base 44 so as to correspond to the pair of the guide rails 42. An opening of each of the guide grooves 46 at the bottom end surface of the slide base 44 has a width which is slightly larger than that of each guide rail 42.

Further, the guide grooves 46 are open respectively at the lengthwise direction both end surfaces of the slide base 44 (both end surfaces of the slide base 44 along the lengthwise direction of the traverse base 14), and the slide base 44 is mounted on the traverse base 14 in a state in which corresponding guide rails 42 are fitted into the respective guide grooves 46. For this reason, at least a movement of the slide base 44 in the widthwise direction of the traverse base 14 is restricted, so that a moving direction of the slide base 44 is fundamentally limited to the lengthwise direction of the traverse base 14.

Further, a structure of the above-described core material sliding/guiding means will be additionally explained next.

By structuring the present embodiment in such a simple way that the guide rails 42 are fitted into the guide grooves 46, the present embodiment can be structured in which the moving direction of the slide base 44 is controlled. In addition to this, by structuring the present embodiment in such a way that a roller as a rolling body is provided at one of the respective inner walls of the guide rail 42 and the guide groove 46, the present embodiment can be structured such that, when the slide base 44 is guided by the guide rails 42 and moved, the roller is rolled with respect to the other of the inner walls of the guide rail 42 and the guide groove 46 in a state in which an outer circumferential portion of the roller is brought in contact with the other inner wall. Further, hereinafter, the above-described additional explanation is referred to as "additional explanation 2".

Further, as shown in FIG. 4, a pair of sliders 47 is provided at the bottom surface of the slide base 44. The pair of the sliders 47 is formed into a plate shape or a block shape, and faces each other in the lengthwise direction of the traverse base 14. Further, female threads are formed at the sliders 47 so as to pass therethrough in the lengthwise direction of the traverse base 14, and disposed in a penetration state in which the ball screw 18 is screwed into the female threads.

By this, when the ball screw 18 is rotated around its shaft center, the sliders 47 and the slide base 44 are slid in an axial direction of the ball screw 18 in accordance with an amount by which the ball screw 18 is rotated.

On the other hand, as shown in FIG. 1, a pair of supporting walls 48 as a supporting portion is provided at the slide base 44. The supporting walls 48 are disposed at lengthwise direction both ends of the slide base 44 so as to face each other along the longitudinal direction of the slide base 44. Shaft receiving holes 52 are formed respectively at the supporting walls 48 so as to be coaxial with each other.

A mandrel 50 as a core material is disposed between the supporting walls 48. Shaft portions 54 are formed at portions of the mandrel 50 facing the shaft receiving holes 52. Each shaft portion 54 is protruded toward each supporting wall 48, inserted into the corresponding shaft receiving hole 52, and supported by the shaft receiving hole 52 so as to be rotatable freely.

Moreover, one shaft portion 54 is penetrated through the shaft-receiving hole 52, and protruded to the other side of the mandrel 50 through the supporting wall 48. A motor 56 as core material rotation means (mechanism) for structuring the core material rotating mechanism is provided at a tip end of the one shaft portion 54. The one shaft portion 54 is connected to an output shaft of the motor 56, directly, or indirectly through the decelerating means (mechanism) such as the decelerating mechanism 22 or driving force transmitting means (mechanism) ('direct connection' in the present embodiment).

The motor 56 is connected to the control portion 36 and the power supply 38 through a driver 58, and in the same manner as in the motor 28, excitation of the motor 56 is controlled by the control portion 36.

(Structure of a Thread-Feeding Mechanism 60)

On the other hand, as shown in FIG. 1, a plurality of thread-feeding mechanisms 60, 62, 64, and 66 as feeding portions (four sets in the present embodiment) is provided at both sides in a widthwise direction of the traverse base 14. Further, although layouts of the thread-feeding mechanisms 60, 62, 64, and 66 are different from each other, they have the same basic structure. For this reason, only a detailed description of a structure of a thread-feeding mechanism 60 will be made. However, detailed descriptions of structures of the remaining thread-feeding mechanisms 62, 64, and 66 will be omitted.

The thread-feeding mechanism 60 has a creel stand 68. The creel stand 68 has a creel base 72 having a plurality of take-up shafts 70 (four in the present embodiment) provided thereon. Filament 74, as a fabric material or a string state material which is one aspect of the elongated material, is accommodated at an outer circumferential portion of each take-up shaft 70 in a taken-up state.

The filament 74 is formed by a so-called glass fiber in which glass is fused and fiber-formed into a long-fiber state (the glass fiber may further be stranded up to form a string). The filament 74 is taken up around the take-up shaft 70 from a longitudinal direction proximal end thereof and a longitudinal direction distal end of the filament 74 is drawn from the take-up shaft 70 in a direction in which the filament 74 is approached to the traverse base 14 substantially in the widthwise direction of the traverse base 14.

A coating portion 76 is provided at the creel stand 68, and the filament 74, which is drawn from the take-up shaft 70, is passed through the coating portion 76. Inside the coating portion 76 are provided a coating reservoir for reserving an unhardened (in other word, liquefied) thermosetting synthetic resin material, a coating roller which is rotatable freely and an outer circumferential portion of which is partially impregnated in the coating reservoir, and the like. The filament 74, when passing through the coating portion 76, is passed through the coating reservoir or is slid on and kept in contact with the outer circumferential portion of the coating roller, and accordingly, is applied and impregnated with the synthetic resin material.

A pre-heater and a tension controller are provided in the coating portion 76. The pre-heater is disposed closer to the longitudinal direction proximal end of the filament 74 (in other words, closer to an inlet of the coating portion 76) than the coating reservoir. The pre-heating portion has a heater, and applies appropriate heat in advance to the filament 74 forwarded to the coating reservoir or the coating roller.

On the other hand, the tension controller is disposed closer to the longitudinal direction proximal end or distal end of the filament 74 (i.e., closer to an outlet of the coating portion 76) than the coating reservoir. The tension controller is provided with a driving roller or the like which is rotatable in the forward and backward directions due to a driving force of driving means (mechanism) such as a motor, for example.

If the tension controller has a structure with such a driving roller, the filament 74 is entrained around the driving roller, and due to a rotational force of the driving roller, which is independent from a rotation of the mandrel 50 being applied to the filament 74, a tensional force of the filament 74 can be freely controlled between the mandrel 50 and the driving roller.

On the other hand, the thread feed mechanism 60 has a traverse mechanism 80. The traverse mechanism 80 comprises a traverse base 82, a ball a screw 84, a motor 86, a slide base 88 and the like each of which corresponds to the traverse base 14, the ball screw 18, the motor 28, the slide base 44 and the like in the core material sliding mechanism of the mandrel driving mechanism 12. In other words, the traverse mechanism 80 has a structure which is basically the same as that of the core material sliding mechanism in the above-described mandrel driving mechanism 12. Due to a driving force of the motor 86, the slide base 88 is slid along a lengthwise direction of the traverse base 82 (the traverse base 82 is in parallel to the traverse base 14, and consequently, the lengthwise direction of the traverse base 82 corresponds to the lengthwise direction of the traverse base 14).

Thus, since the traverse mechanism 80 is basically structured in the same manner as the core material sliding mechanism in the mandrel driving mechanism 12, a detailed description of the structure of the traverse mechanism 80 will be omitted. Further, since the traverse mechanism 80 is basically structured in the same manner as the core material sliding mechanism in the mandrel driving mechanism 12, it is needless to say that the above-described additional explanations 1 and 2 can be applied to the traverse mechanism 80.

Further, a connecting piece 90 is extended from the slide base 88 in the traverse mechanism 80. A lengthwise direction intermediate portion of the connecting piece 90 is bent so as to form a substantially "L" shape. A lengthwise direction of a portion on the side of a tip end of the connecting piece 90 than the bent portion corresponds to a tangent direction with respect to a circle with the rotation shaft center of the mandrel 50 as a center.

Figure 6:
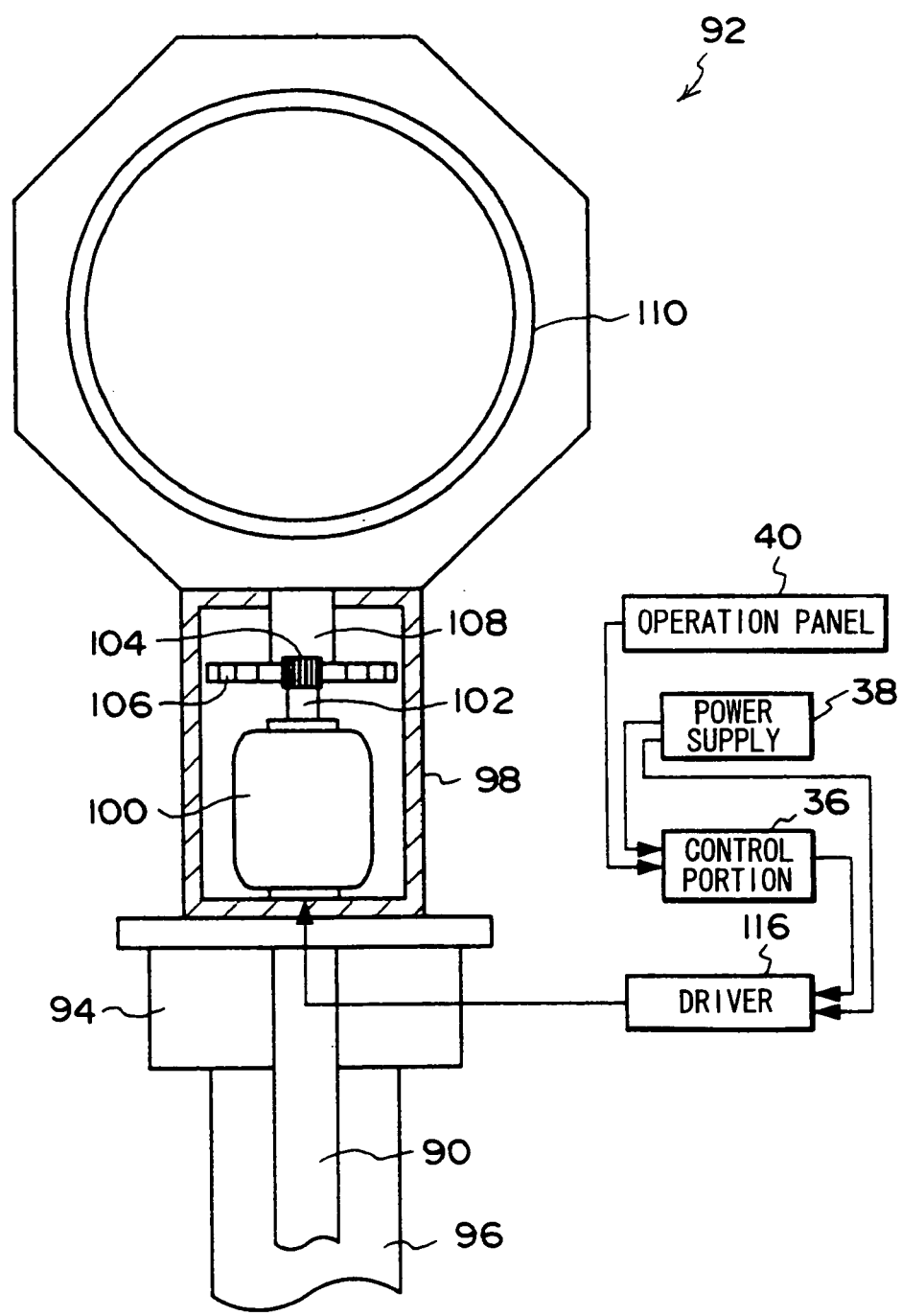
FIG. 6 is a schematic control block diagram of a driving system of a guiding mechanism of the filament winding apparatus in FIG. 1.

A guiding mechanism 92 as guiding means is provided at a tip end portion of the connecting piece 90. As shown in FIG. 6, the guiding mechanism 92 has a guiding ring 94. The guiding ring 94 is formed into a predetermined annular-shaped configuration (substantially a rectangular shape in the present embodiment), and a tip end of the connecting piece 90 is connected to one side of the guiding ring 94 to be integrated therewith.

A rod 96 is passed through the guiding ring 94 so as to be slidable freely therein, and fixed to the guiding ring 94 by an unillustrated stopper. A gear box 98 is provided at a tip end of the rod 96 to be integrated therewith.

As shown in FIG. 6, inside the gear box 98 is provided a motor 100 for structuring a guide rotating/driving mechanism as guide rotating/driving means. A gear 104, as the driving force-transmitting means (mechanism) or the decelerating means (mechanism), for structuring a row of gears in the guide rotating/driving mechanism is coaxially connected to a tip end of an output shaft 102 of the motor 100 to be integrated therewith.

A gear 106 whose diameter is larger than that of the gear 104 meshes with the gear 104. A turning shaft 108 is extended from a shaft center of the gear 106, and passed through the gear box 98. A thread-feeding opening 110 as a guiding portion of the turning shaft 108 is integrally connected to the turning shaft 108.

The thread-feeding opening 110 is formed into a substantially ring shape, and an opening direction of the thread-feeding opening 110 corresponds to a radial direction with an imaginary line, which is extended from a shaft center of the turning shaft 108 and passed through the center of the thread-feeding opening 110, as an axis. As the thread-feeding opening 110 is viewed in an axial direction of the mandrel 50, the opening direction of the thread-feeding opening 110 substantially corresponds to a tangent direction to a circle of the mandrel 50 with the shaft center of the rotation as a center. As described above, since the turning shaft 108 is mechanically connected to the motor 100 through the gears 104 and 106, when the turning shaft 108 is rolled due to a driving force of the motor 100, the thread-feeding opening 110 is rolled integrally with the turning shaft 108, and the opening direction of the thread-feeding opening 110 is changed.

A roller 112 is disposed at an opposite side of the mandrel 50 with respect to the thread-feeding opening 110 along a tangent, which passes through the thread-feeding opening 110, of an imaginary circle with a rotation axis of the mandrel 50 as a center. The filament 74 which is passed through the coating portion 76 is entrained around the roller 112, and the filament 74 which is entrained around the roller 112 is passed through the thread-feeding opening 110, and then entrained around the mandrel 50.

Further, the thread-feeding openings 110 of the thread-feeding mechanisms 60, 62, 64 and 66 are provided to be positioned substantially on the same imaginary circumference with the rotation shaft center of the mandrel 50 as a center.

Moreover, as shown in FIG. 5, the motors 86 of the thread-feeding mechanisms 60, 62, 64 and 66 are connected to the control portion 36 and the power supply 38, through drivers 114 which are provided so as to correspond to the respective motors 86, and on the basis of a control signal from the control portion 36, the drivers 114 control currents flown into the corresponding motors 86. For this reason, the slide bases 88 of the thread-feeding mechanisms 60, 62, 64 and 66 slide individually in the lengthwise directions of the traverse bases 82 (in other words, the lengthwise direction of the traverse base 14, and the rotation axial direction of the mandrel 50).

Lengths of the traverse base 14 and the guide rails 42 or those of the traverse bases 82, and positions of the traverse base 82 along the lengthwise direction of the traverse base 14 are determined such that, in a state in which the slide base 44 is slid closest to the lengthwise direction one end of the traverse base 14 and each slide base 88 is slid closest to the lengthwise direction other end of each traverse base 82 (i.e., the lengthwise direction other end of the traverse base 14), at least an end portion of the mandrel 50 at the lengthwise direction other end of the traverse base 14 (i.e., in this state, an end portion of the mandrel 50 which is closest to each slide base 88) is positioned further closer to the lengthwise direction one end of the traverse base 14 than each slide base 88.

Further, the motors 100 of the thread-feeding mechanisms 60, 62, 64, and 66 are connected to the control portion 36 and the power supply 38 through drivers 116 which are provided so as to correspond to the respective motors 100. The drivers 116 control currents flown into the corresponding motors 100 on the basis of control signals which are transmitted from the control portion 36. For this reason, the thread-feeding openings 110 of the thread-feeding mechanisms 60, 62, 64, and 66 are individually rolled, and opening directions of the thread-feeding openings 110 are changed.

Operations and Effects of the First Embodiment of the Present Invention

Next, operations and effects of the present embodiment will be explained for each winding pattern of the filament 74 around the mandrel 50.

(First Pattern)

A first pattern is a winding pattern which is referred to as "hoop winding". The mandrel 50 is mounted to the shaft portions 54 between both of the supporting portions 48. In this state, when the first pattern is selected and operated by the operation panel 40 or the like, for example, on the basis of an operation signal from the operation panel 40, the control portion 36 controls each of the drivers 114 of the thread-feeding mechanisms 60, 62, 64 and 66. Each driver 114 which is controlled by the control portion 36 allows a current to flow into the corresponding motor 86 for a predetermined period of time, and drives the motor 86.

Figure 7A:
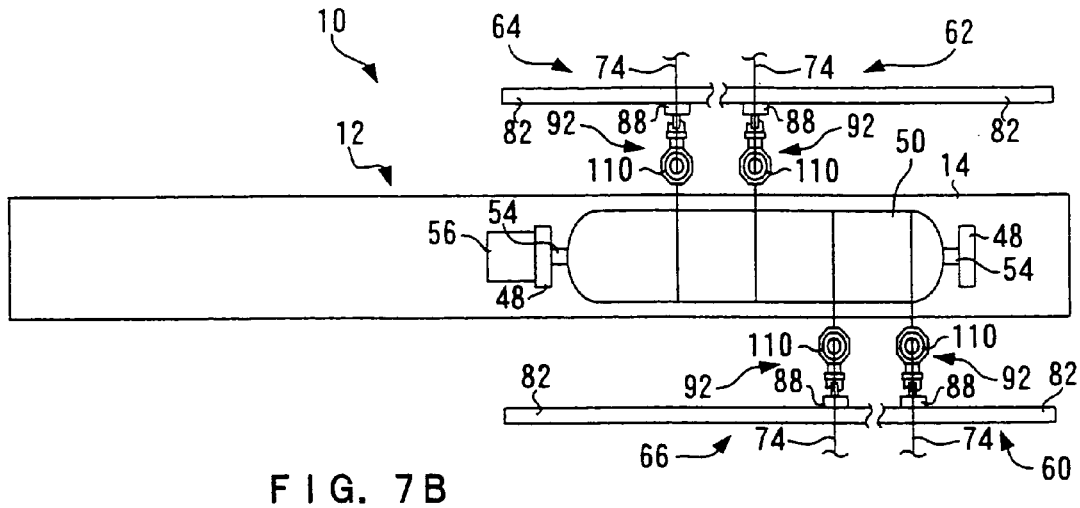
FIG. 7A is a schematic view illustrating a state of the filament winding apparatus in FIG. 1 when a first pattern (hoop winding) is used for a winding pattern of a filament, and illustrates a state of the apparatus at the beginning of the winding of the filament.

Due to each motor 86 of the thread-feeding mechanism 60, 62, 64 or 66 being driven, each ball screw 84 is rotated. By this, each guiding mechanism 92 is slid on each traverse base 82. Accordingly, as shown in FIG. 7A, the guiding mechanism 92 of the thread-feeding mechanism 60 is positioned at one end of a winding range of the filament 74 around the mandrel 50 along the rotation axial direction of the mandrel 50.

Further, the guiding mechanism 92 of the thread-feeding mechanism 66 which is positioned directly beneath the guiding mechanism 92 of the thread-feeding mechanism 60 is positioned at the axial direction other end of the mandrel 50 by about ¼ stroke of the winding range along the aforementioned axial direction with respect to the guiding mechanism 92 of the thread-feeding mechanism 60. In the same manner as this, the guiding mechanism 92 of the thread-feeding mechanism 62 is positioned at the axial direction other end of the mandrel 50 by about ¼ stroke of the winding range along the aforementioned axial direction with respect to the guiding mechanism 92 of the thread-feeding mechanism 66. Moreover, the guiding mechanism 92 of the thread-feeding mechanism 64 which is positioned directly beneath the guiding mechanism 92 of the thread-feeding mechanism 62 is positioned at the axial direction other end of the mandrel 50 by about ¼ stroke of the winding range along the aforementioned axial direction with respect to the guiding mechanism 92 of the thread-feeding mechanism 62.

Thus, in a state in which the guiding mechanism 92 of each of the thread-feeding mechanisms 60, 62, 64 and 66 is set, a tip end of the filament 74 drawn from the take-up shaft 70 of the creel stand 68 of each of the thread-feeding mechanisms 60, 62, 64 and 66 is entrained around the outer circumferential portion of the mandrel 50. In this state, the driver 58 is controlled by the control portion 36, and the motor 56 is energized.

Therefore, when the motor 56 is driven, the shaft portions 54 are rotated, and the mandrel 50 is then rotated around the shaft portions 54. When the mandrel 50 is rotated around the shaft portions 54, each filament 74 is wound sequentially around the outer circumferential portion of the mandrel 50 from the tip end thereof.

Further, in this way, the mandrel 50 is rotated around the shaft portions 54 and each filament 74 is wound around the outer circumferential portion of the mandrel 50, during which, the driver 32 is controlled by the control portion 36, and the motor 28 is energized. When the motor 28 is energized and driven, the ball screw 18 is rotated, and the mandrel 50 is slid along the traverse base 14 toward the axial direction one end of the mandrel 50.

Figure 7B:
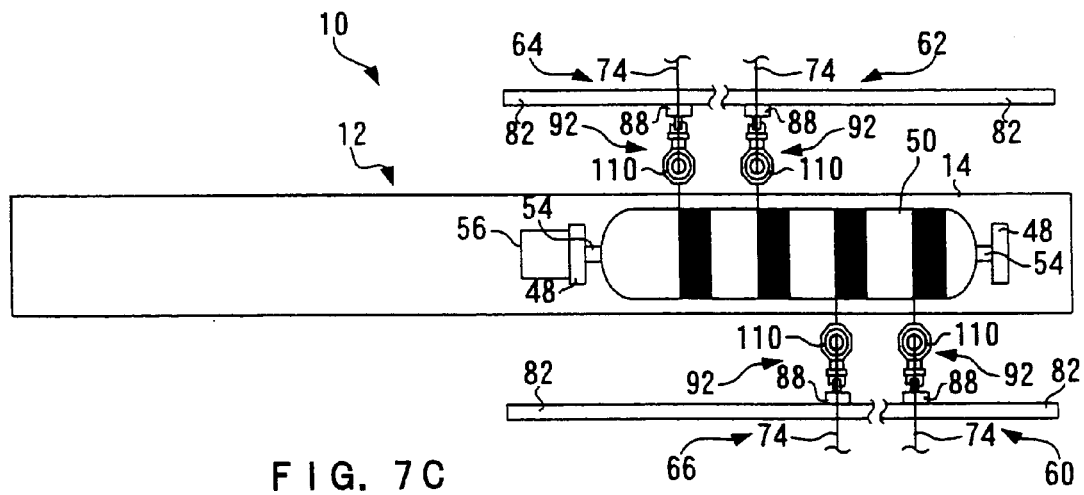
FIG. 7B illustrates a state of the apparatus in the middle of the winding of the filament in FIG. 7A.

In this way, due to the mandrel 50 being slid on the traverse base 14 in a state in which the mandrel 50 is rotated, as shown in FIG. 7B, a position at which the filament 74 is wound around the circumferential portion of the mandrel 50 at each of the thread-feeding mechanisms 60, 62, 64 and 66 is changed to the axial direction other end of the mandrel 50. Consequently, the filament 74 is wound around the outer circumferential portion of the mandrel 50 between a winding position of the filament 74 at the beginning of a rotation of the mandrel 50, and a current winding position of the filament 74.

Figure 7C:
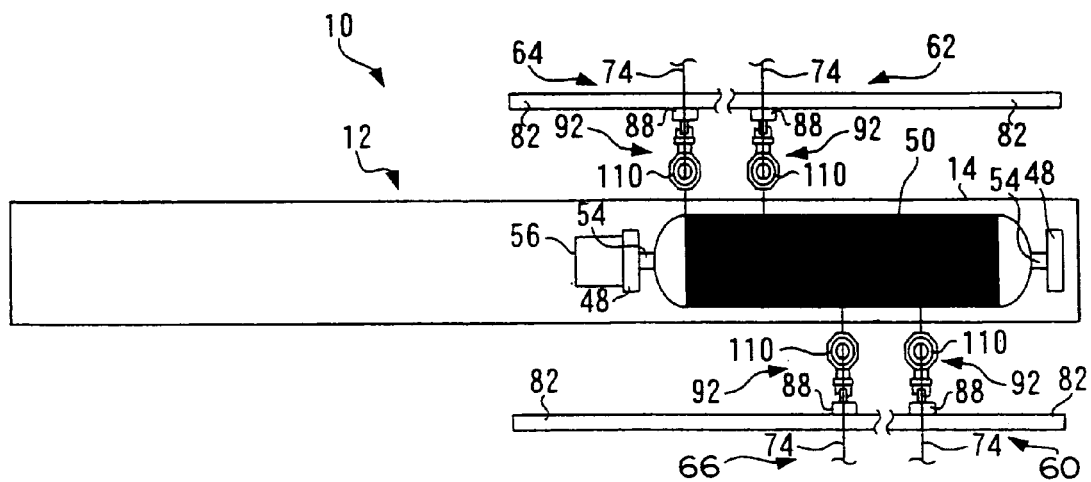
FIG. 7C illustrates a state of the apparatus at the end of the winding of the filament in FIG. 7A.

Further, as shown in FIG. 7C, when the mandrel 50 is slid to the axial direction one end of the mandrel 50 by about ¼ stroke of the winding range of the filament 74 along the rotation axial direction of the mandrel 50, a winding position at which the filament 74 is wound around the mandrel 50 at the thread-feeding mechanism 60 is reached to the winding position of the filament 74 at the thread-feeding mechanism 66 at the start of a rotation of the mandrel 50. Similarly, in this state, the winding position of the filament 74 at the thread-feeding mechanism 66 is reached to the winding position of the filament 74 at the thread-feeding mechanism 62 at the start of a rotation of the mandrel 50, while the winding position of the filament 74 at the thread-feeding mechanism 62 is reached to the winding position of the filament 74 at the thread-feeding mechanism 64 at the start of the rotation of the mandrel 50.

Moreover, by a position of the guiding mechanism 92 at the thread-feeding mechanism 64 being relatively changed by substantially ¼ stroke of the winding range of the filament 74 around the mandrel 50 with respect to the mandrel 50 in the rotation axial direction of the mandrel 50 when a rotation of the mandrel 50 is started, the guiding mechanisms 92 at the thread-feeding mechanism 64 is reached to the axial direction other end of the winding range of the filament 74 around the mandrel 50. Consequently, the filament 74 is wound around the entire region of the winding range of the filament 74 around the mandrel 50.

Here, in the filament winding apparatus 10 of the present embodiment, when a hoop winding as the first pattern is carried out, a winding position of the filament 74 is changed by sliding the mandrel 50 in the rotation axial direction of the mandrel. For this reason, at the time when the winding position of the filament 74 around the mandrel 50 is changed, the filament 74 is not moved in the axial direction of the mandrel 50 at a position closer to the lengthwise direction proximal end of the wound-around position of the filament 74 (i.e., the filament 74 is not swung in the axial direction of the mandrel 50).

By this, occurrences of twisting or distortion as well as scuffing at the filament 74 due to the filament 74 being swung can be prevented or can be minimized extremely effectively. As a result, deterioration of a forming core material quality during a hardening of a synthetic resin material coated on the filament 74 can be suppressed.

If the filament 74 is wound around the mandrel 50 merely by the thread-feeding mechanism 60, the mandrel 50 must be slid to the axial direction one end by a stroke corresponding to the entire region of the winding range of the filament 74 along the axial direction of the mandrel 50.

On the other hand, in the filament winding apparatus 10 of the present embodiment, by sliding the mandrel 50 in the axial direction one end by about ¼ of a stroke corresponding to the entire region in the winding range, the winding of the filament 74 can be finished. Therefore, time taken from the start of the winding to the finish of the winding of the filament 74 can be shortened to about ¼ of the time as compared to a case when only the thread-feeding mechanism 60 is used. Accordingly, by a simple calculation, productivity can be improved to about four times.

Figure 8:
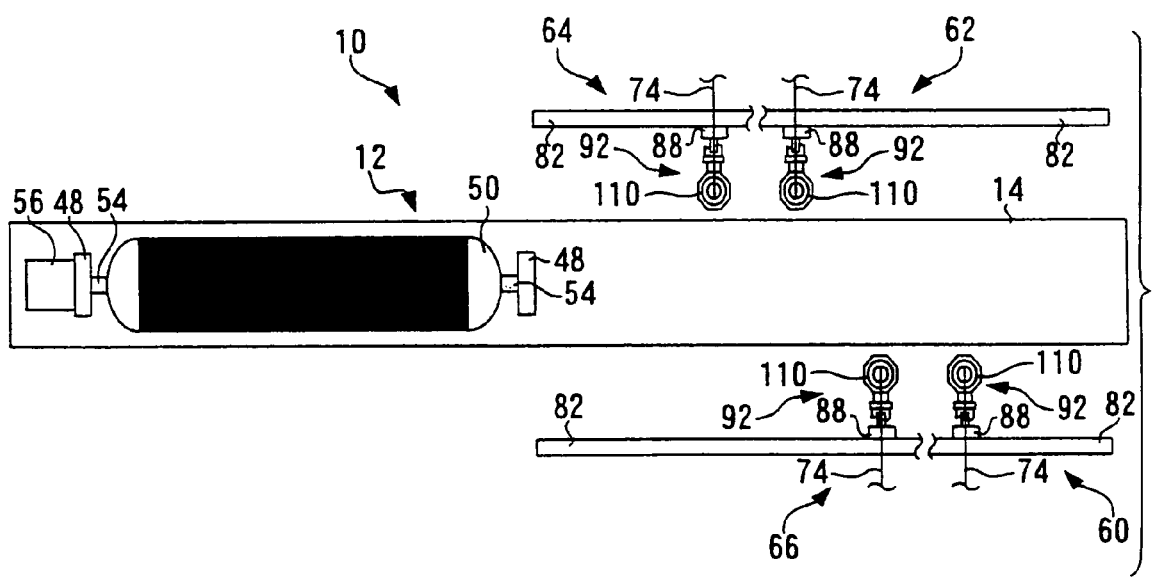
FIG. 8 is a schematic view illustrating a state of the filament winding apparatus in FIG. 1 when a core material is removed from the apparatus.

Next, in this way, after the winding of the filament 74 has been completed, the driver 32 is controlled by the control portion 36, and the motor 28 is energized. When the motor 28 is energized and driven, the ball screw 18 is rotated, and the mandrel 50 is slid to the axial direction other end of the mandrel 50 on the traverse base 14. By this, as shown in FIG. 8, the supporting wall 48 at the axial direction one end side of the mandrel 50 is moved closer further to the other end side of the traverse base 14 than the traverse base 82 of each of the thread-feeding mechanisms 60, 62, 64 and 66.

In this state, the traverse base 82 and the guiding mechanism 92 at each of the thread-feeding mechanisms 60, 62, 64 and 66 are not positioned at a rotational radial side of the mandrel 50. Therefore, during a detachment of the mandrel 50 from the shaft portions 54, neither the traverse base 82 nor the guiding mechanism 92 can be in the way for the detachment thereby facilitating the mandrel 50 to be detached from the shaft portions 54. The same description can be made as to an attachment of the mandrel 50 to the shaft portions 54.

(Second Pattern)

The second pattern is a winding pattern referred to as a "helical winding". Also in the second pattern, the mandrel 50 can be attached to the shaft portions 54 between both of the supporting walls 48.

In this state, when the second pattern is selected and operated by the operation panel 40 or the like, for example, on the basis of an operation signal from the operation panel 40, each of the drivers 114 of the thread-feeding mechanisms 60, 62, 64 and 66 is controlled by the control portion 36. Each driver 114, which is controlled by the control portion 36, allows a current to flow into the corresponding motor 86 for a predetermined period of time, and drives the motor 86. Due to each motor 86 of the thread-feeding mechanisms 60, 62, 64 or 66 being driven, each ball screw 84 is rotated, and accordingly, the guiding mechanism 92 slides on the traverse base 82.

Figure 9A:
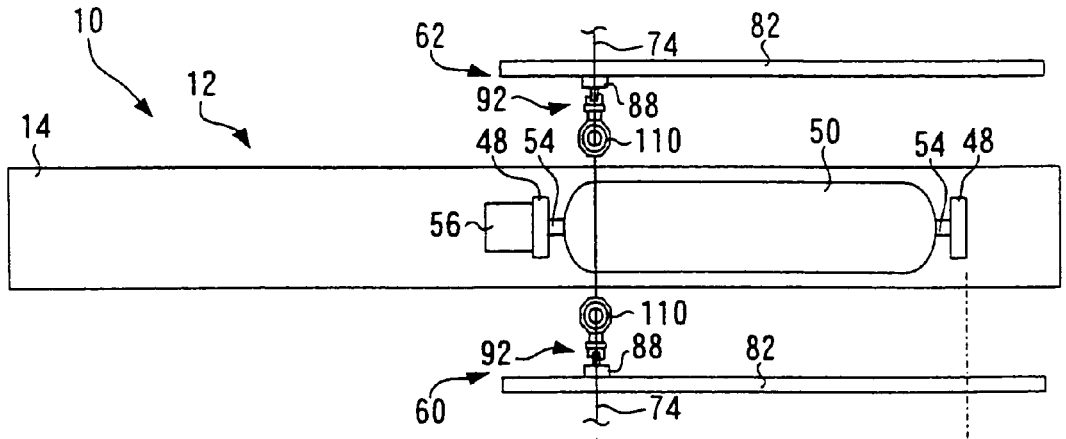
FIG. 9A is a schematic view illustrating a state of the filament winding apparatus in FIG. 1 when a second pattern and a third pattern (both are helical windings) are used for a winding pattern of a filament, and illustrates a state of the apparatus at the beginning of the winding of the filament.
Figure 9B:
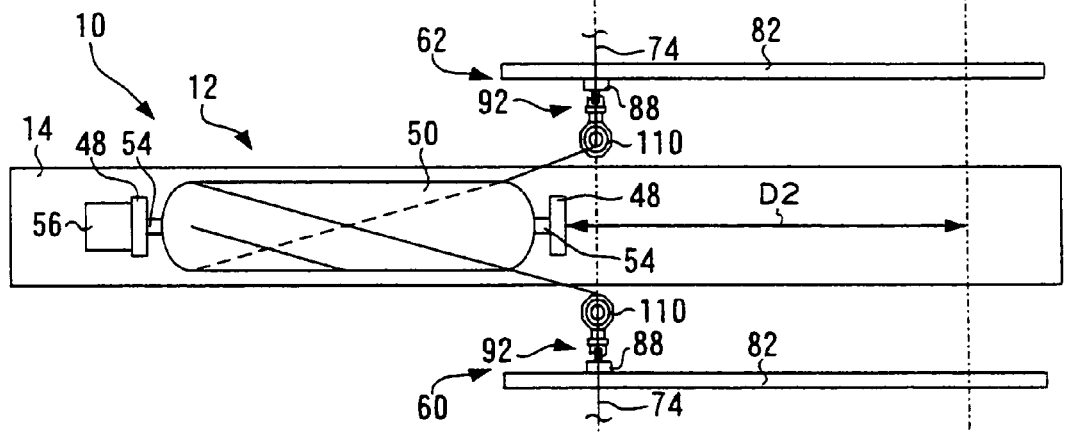
FIG. 9B illustrates a state of the apparatus when the filament in FIG. 9A is wound in the second pattern.
Figure 9C:
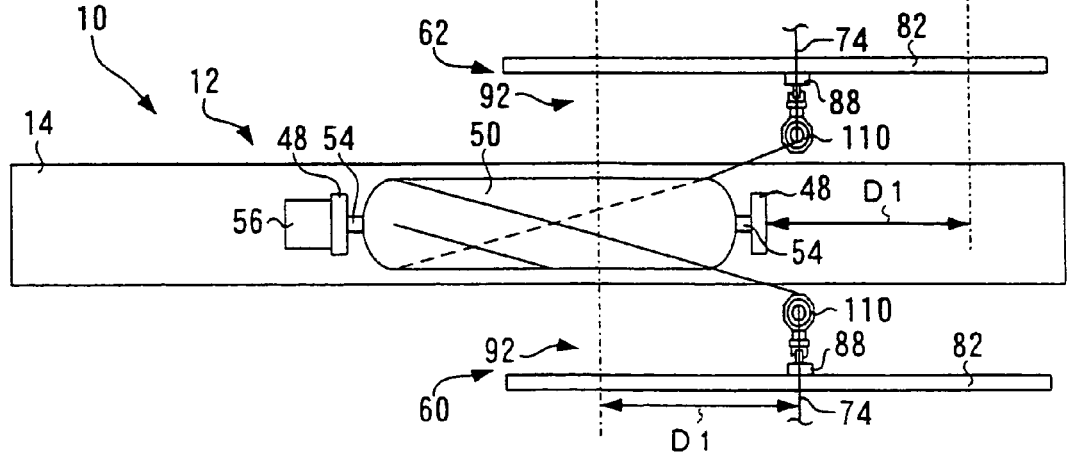
FIG. 9C illustrates a state of the apparatus when the filament in FIG. 9A is wound in the third pattern.

By this, as shown in FIG. 9A, the guiding mechanism 92 of each of the thread-feeding mechanisms 60, 62, 64 and 66 is positioned at the other end of the winding range of the filament 74 around the mandrel 50 in a rotation axial direction of the mandrel 50 (in accordance with structures shown in FIGS. 9A to 9C, the thread-feeding mechanisms 64 and 66 are positioned directly beneath the thread-feeding mechanisms 60 and 62, illustrations of the thread-feeding mechanisms 64 and 66 are thereby omitted).

Thus, when the guiding mechanism 92 is set at each of the thread-feeding mechanisms 60, 62, 64 and 66, tip ends of the filament 74 that are drawn from the take-up shafts 70 of the creel stands 68 at the thread-feeding mechanisms 60, 62, 64 and 66 are entrained around the outer circumferential portion of the mandrel 50 in a state in which the tip ends of the filament 74 are out of phase by 90° (a quarter of 360°) with respect to the axis of the mandrel 50 from each other. In this state, the drivers 32 and 58 are controlled by the control portion 36, and the motors 28 and 56 are energized.

When the motors 28 and 56 are driven, the shaft portions 54 are rotated to thereby rotate the mandrel 50 around the shaft portions 54, and due to a driving force of the motor 28, the ball screw 18 is rotated, and the mandrel 50 is slid on the traverse base 14 to the axial direction other end thereof. In this way, since the rotation of the mandrel 50 and the sliding thereof on the traverse base 14 are implemented together, as shown in FIG. 9B, the filament 74 is diagonally wound around the outer circumferential portion of the mandrel 50 spanning between the axial direction one end and the axial direction other end of the mandrel 50.

Further, during a back and forth movement of the mandrel 50 on the traverse base 14, the mandrel 50 is rotated, whereby the filament 74 is wound around the entire region within the winding range of the filament 74 around the outer circumferential portion of the mandrel 50.

Here, in the filament winding apparatus 10 of the present embodiment, in carrying out a helical winding as the second pattern, by sliding the mandrel 50 in the rotation axial direction, a winding position of the filament 74 is changed. For this reason, when the winding position of the filament 74 is changed, the filament 74 is not moved in the axial direction of the mandrel 50 at a position further closer to the lengthwise direction proximal end of the filament 74 than to the winding position of the filament 74 (i.e., the filament 74 is not swung in the axial direction of the mandrel 50).

By this, occurrences of twisting or distortion as well as scuffing at the filament 74 due to the filament 74 being swung can be prevented or can be minimized extremely effectively. As a result, deterioration of a forming core material quality during a hardening of a synthetic resin material coated on the filament 74 can be suppressed.

Further, if the filament 74 is wound around the mandrel 50 merely by the thread-feeding mechanism 60, the mandrel 50 must be continuously rotated to move back and forth until a winding of the filament 74 around the entire region within the winding range of the filament 74 around the outer circumferential portion of the mandrel 50.

On the other hand, in the filament winding apparatus 10 of the present embodiment, tip ends of the filaments 74 that are drawn respectively from the take-up shafts 70 of the thread-feeding mechanisms 60, 62, 64 and 66 are entrained around the axis of the mandrel 50 in a state in which the tip ends of the filaments 74 are out of phase by 90° from each other. For this reason, by a simple calculation, a winding amount of the filaments 74 in which the filaments 74 are wound around the mandrel 50 can be increased about four (4) times per an hour as compared to a case in which the filaments 74 are wound around the mandrel 50 merely by the thread-feeding mechanism 60.

Accordingly, if the mandrel 50 is moved back and forth while being rotated with the same speed as in a case in which the filament 74 is wound around the mandrel 50 merely by the thread-feeding mechanism 60, the rotational number or the number of the back and forth movement of the mandrel 50 can be decreased to about ¼ thereof. Consequently, time take from the start of the winding to the end of the winding of the filament 74 can be shortened to about ¼ times as compared to a case in which only the thread-feeding mechanism 60 is used, and by a simple calculation, productivity can be increased by about 4 times as compared to a case in which only the thread-feeding mechanism 60 is used.

Next, in this way, after the winding of the filament 74 has been completed, in the same manner as in the first pattern, the supporting wall 48 at the axial direction one end of the mandrel 50 is moved closer to the other end of the traverse base 14 further than the traverse base 82 of each of the thread-feeding mechanisms 60, 62, 64 and 66. Accordingly, during a detachment of the mandrel 50 from the shaft portions 54, neither the traverse base 82 nor the guiding mechanism 92 can be in the way for the detachment thereby facilitating the mandrel 50 to be detached from the shaft portions 54.

(Third Pattern)

The third pattern is a winding pattern which is referred to as a helical winding which is wound basically in the same manner as the second pattern. However, as shown in FIG. 9C, the third pattern is different from the second pattern in that a back and forth movement stroke D1 of the mandrel 50 on the traverse base 14 due to a driving force of the motor 28 is about a half a back and forth movement stroke D2 in the second pattern.

Further, in the third pattern, as shown in FIG. 9C, each of the drivers 114 is controlled by the control portion 36, and due to a driving force of each of the motors 86, each of the ball screws 84 is rotated. The rotation of the ball screw 84 is carried out in accordance with that of the ball screw 18 due to a driving force of the motor 28. Accordingly, the guiding mechanism 92 of each of the feeding mechanisms 60, 62, 64 and 66 moves back and forth on the traverse base 82, by the stroke D1 at the same speed as that of the mandrel 50, in a direction opposite to a moving direction of the back and forth movement of the mandrel 50.

Further, the drivers 116 are controlled by the control portion 36. In accordance with a back and forth movement of each of the guiding mechanisms 92, each motor 100 is appropriately driven. Due to a driving force of the motor 100, the thread-feeding opening 110 of each of the thread-feeding mechanisms 60, 62, 64 and 66 is individually turned, whereby a direction of each thread-feeding opening 110 is changed in accordance with a position of the thread-feeding opening 110 of each of the thread-feeding mechanisms 60, 62, 64 and 66 with respect to the mandrel 50 in the axial direction of the mandrel 50.

Here, if the mandrel 50 moves back and forth in the third pattern at the same speed as that in the second pattern, each guiding mechanism 92 is moved at the same speed and by the same stroke in a direction opposite to the mandrel 50. Accordingly, a relative speed of each guiding mechanism 92 and the mandrel 50 in the third pattern becomes about twice as high as that in the second pattern. For this reason, when the rotation speed of the mandrel 50 in the third pattern is accelerated to a speed twice as high as that in the second pattern, a winding of the filament 74 in the third pattern can be accomplished at a speed about twice as high as that in the second pattern.

Being different from the second pattern, in the third pattern, the guiding mechanism 92 moves back and forth on the traverse base 82. However, as compared to a structure in which the guiding mechanism 92 is simply moved back and forth to carry out the helical winding of the filament 74, in the filament winding apparatus 10 of the present embodiment, the mandrel 50 moves back and forth when the third pattern is carried out.

For this reason, a stroke along the back and force movement of the guiding mechanism 92 can be about ½ times of a stroke when the helical winding is carried out by simply allowing the guiding mechanism 92 to move back and forth. Thus, as compared to a structure in which the helical winding is carried out by simply allowing the guiding mechanism 92 to move back and forth, in accordance with the filament winding apparatus 10 of the present embodiment, the stroke along the back and force movement of the guiding mechanism 92 for carrying out the third pattern can be reduced. Accordingly, occurrences of twisting or distortion as well as scuffing at the filament 74 due to the filament 74 being swung can be minimized extremely effectively. Consequently, deterioration of a forming core material quality during a hardening of a synthetic resin material coated on the filament 74 can be suppressed.

Second Embodiment

Next, a description of a second embodiment of the present invention will be made. Further, in making a description of the second embodiment of the present invention, portions substantially identical to those in the first embodiment are denoted by the same reference numerals and a description thereof will be omitted.

Figure 10:
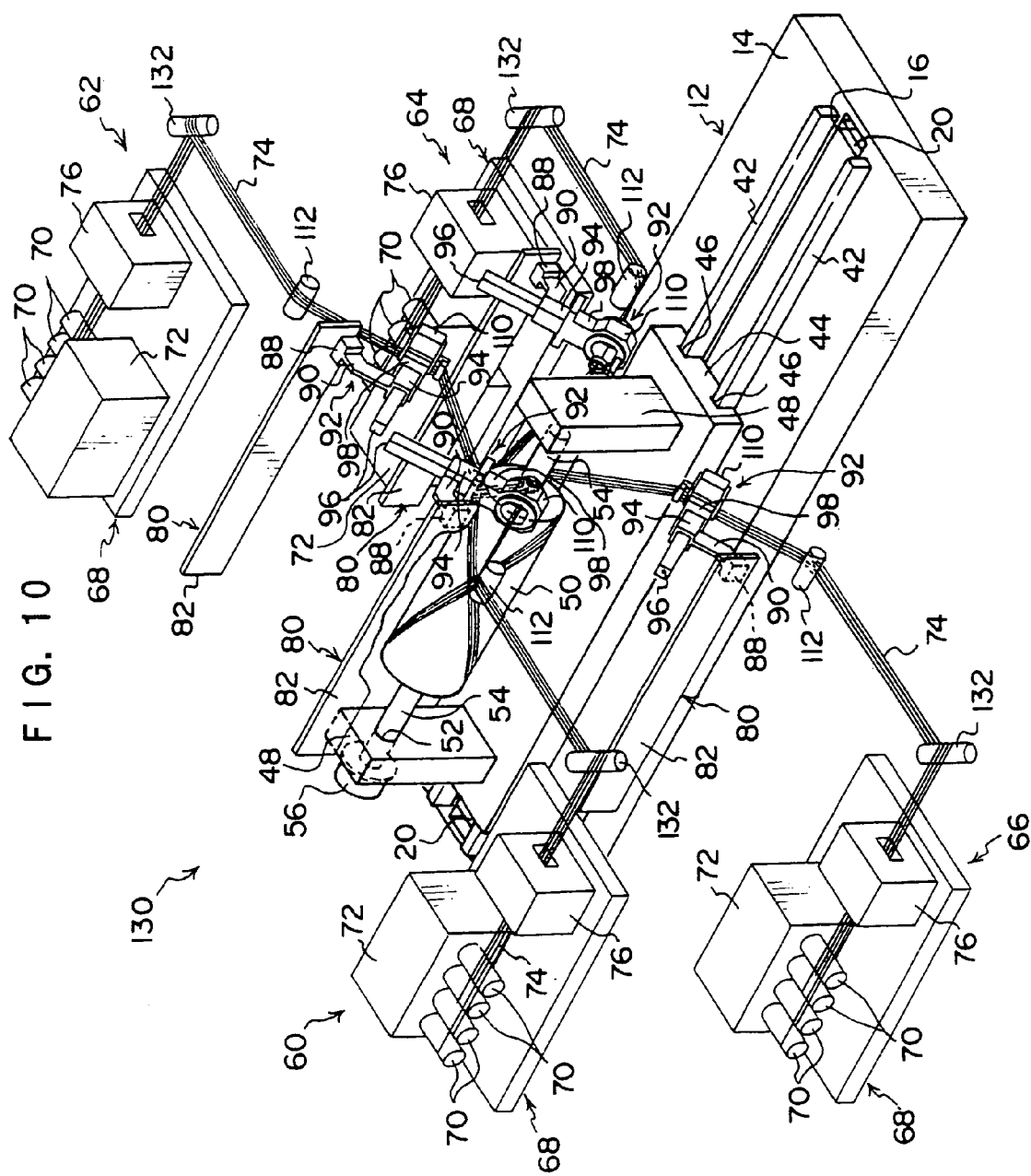
FIG. 10 is a perspective view illustrating a filament winding apparatus according to a second embodiment of the present invention.

FIG. 10 shows a schematic perspective view of a structure of a filament winding apparatus 130 according to the present embodiment. Further, FIG. 11 shows a schematic plan view of the structure of the filament winding apparatus 130 according to the present embodiment.

As shown in FIGS. 10 and 11, in the present filament winding apparatus 130 of the present embodiment, a diversion pulley 132 as diverting means (mechanism) is interposed between the thread-feeding opening 110 of each of the thread-feeding mechanisms 60, 62, 64 and 66, and the creel stand 68 of each of the thread-feeding mechanisms 60, 62, 64 and 66 that corresponds to the thread-feeding openings 110 of the thread-feeding mechanisms 60, 62, 64 and 66.

In the present embodiment, in the same manner as in the first embodiment of the present invention, a lengthwise direction of the filament 74 between the thread-feeding opening 110 and the diversion pulley 132 corresponds to the rotational radius direction of the mandrel 50. However, by the filament 74 being entrained around the diversion pulley 132 between the thread-feeding opening 110 and the creel stand 68, a portion of the filament 74 closer to the proximal end portion than the diversion pulley 132, that is to say, a lengthwise direction portion of the filament 74 from the creel stand 68 to the diversion pulley 132 extends substantially in the same direction as that of the traverse base 14 (i.e., the rotation axial direction of the mandrel 50).

In this way, in the filament winding apparatus 130 of the present embodiment, since a portion of the filament 74 further closer to the proximal end portion than the diversion pulley 132 corresponds to the lengthwise direction of that of the traverse base 14, a width or a height of the apparatus as a whole (i.e., a size of the apparatus as a whole along the rotational radius direction of the mandrel 50) can be reduced, and the entire apparatus can be made compact.

As described above, in accordance with the filament winding apparatus according to the above-described embodiments of the present invention, operability of both a detachment operation of a core material from supporting portion and an attachment operation of the core material to the supporting portion can be noticeably enhanced while suppressing the apparatus from being made larger.

Further, the present invention can deal with various aspects of winding an elongated material around a core material.

Moreover, effective improvement of molding quality and enhancement of production efficiency can be realized.

Furthermore, production efficiency can further be enhanced.

Moreover, during a rotation of the core material, variation of a tensional force that is applied to each elongated material can be minimized thus making it possible to improve formability or the like.

INDUSTRIAL AVAILABILITY

The present invention can provide a filament winding apparatus in which time for winding an elongated material can be reduced without damaging operability during attachment/detachment of a core material, and which can prevent the apparatus from becoming larger.

The invention claimed is:

1. A filament winding apparatus for rotating in a predetermined direction a core material that is supported by a supporting portion, and for winding around the core material, an elongated material which has flexibility and which is impregnated with an unhardened synthetic resin material, the filament winding apparatus comprising:
   a plurality of feeding portions for feeding a plurality of elongated materials; and
   a plurality of guiding mechanisms which are positioned around the core material so as to correspond to the plurality of elongated materials that are drawn from the plurality of feeding portions, and through which the corresponding elongated materials are passed,
   wherein at least one of the supporting portion and the plurality of guiding mechanisms are movable in a rotation axial direction, from a winding operation range in which the elongated materials can be guided by the plurality of guiding mechanisms to winding positions at which the elongated materials are wound around the core material, to an attachable/detachable position at which a clearance in the rotation axial direction from the plurality of guiding mechanisms to the core material and the supporting portion is formed,
   wherein the plurality of guide mechanisms are disposed at different positions in the axial direction of the core material, and
   wherein each of the plurality of guiding mechanisms has an opening, each opening has an opening direction and is driven to individually turn around an axis perpendicular to the rotation axial direction to change the opening direction.

2. The filament winding apparatus according to claim 1, wherein each of the plurality of guiding mechanisms is made movable independently in the rotation axial direction.

3. The filament winding apparatus according to claim 1, wherein, during the winding of the elongated material around the core material, the supporting portion is moved in the rotation axial direction in the winding operation range.

4. The filament winding apparatus according to claim 3, wherein, in accordance with the movement of the supporting portion in the rotation axial direction, the plurality of guiding mechanisms is moved in a direction opposite to the direction in which the supporting portion is moved.

5. The filament winding apparatus according to claim 1, wherein the plurality of guiding mechanisms is provided on a substantially concentric circumference with an axial center of rotation as a center.

6. The filament winding apparatus according to claim 5, wherein the plurality of guiding mechanisms is disposed at point symmetric positions with an axial center of the rotation as a center.

7. The filament winding apparatus according to claim 5, wherein at least two of the plurality of feeding portions are disposed in a vertical direction of the apparatus.

8. The filament winding apparatus according to claim 1, further comprising a diversion mechanism for changing a route of each of the plurality of elongated materials that are drawn from the plurality of feeding portions in a direction which is substantially parallel to the rotation shaft center of the core material.

9. A method of manufacturing a composite material by using a filament winding method for rotating in a predetermined direction a core material which is supported by a supporting portion, and for winding around the core material, an elongated material which has flexibility and which is impregnated with an unhardened synthetic resin material, the method comprising:
   feeding a plurality of elongated materials from a plurality of feeding portions;
   passing the plurality of elongated materials that are drawn from the plurality of feeding portions through a plurality of corresponding guiding mechanisms;
   positioning the plurality of guiding mechanisms around the core material; and
   moving at least one of the supporting portion and the plurality of guiding mechanisms in a rotation axial direction, from a winding operation range in which the elongated materials can be guided by the guiding mechanisms to winding positions at which the elongated materials are wound around the core material, to an attachable/detachable position at which a clearance in the rotation axial direction from the plurality of guiding mechanisms to the core material and the supporting portion is formed,
   wherein the plurality of guide mechanisms are disposed at different positions in the axial direction of the core material, and
   wherein each of the plurality of guiding mechanisms has an opening, each opening has an opening direction and is driven to individually turn around an axis perpendicular to the rotation axial direction to change the opening direction.

10. The method of manufacturing a composite material using the filament winding method according to claim 9, wherein the plurality of guiding mechanisms is made independently movable in the rotation axial direction.

11. The method of manufacturing a composite material using the filament winding method according to claim 9, wherein the plurality of guiding mechanisms is provided on a substantially concentric circumference with the rotational axis as a center.

12. The filament winding apparatus according to claim 1, wherein the plurality of guiding mechanisms are adapted to be movable in a rotation axial direction relatively from corresponding feeding portions.

13. The method of manufacturing a composite material using the filament winding method according to claim 9, wherein the plurality of guiding mechanisms are adapted to be movable in a rotation axial direction relatively from corresponding feeding portions.

14. The filament winding apparatus according to claim 1, wherein a sliding movement of the core material in the rotation axial direction is synchronously controlled with driving of the openings of the plurality of guiding mechanisms.

15. The method of manufacturing a composite material using the filament winding method according to claim 9, wherein a sliding movement of the core material in the rotation axial direction is synchronously controlled with driving of the openings of the plurality of guiding mechanisms.

* * * * *